United States Patent [19]

Chiang et al.

[11] Patent Number: 5,791,835
[45] Date of Patent: Aug. 11, 1998

[54] HOLDING FIXTURE USED IN WOODWORKING FOR PREPARING POCKET JOINTS

[76] Inventors: Vance Chiang; Chao-Cheng Huang, both of No. 7, Lane 145, Te Hsing Road, Ta Chia, Taichung, Taiwan

[21] Appl. No.: 604,575

[22] Filed: Feb. 21, 1996

[51] Int. Cl.⁶ .................................................. B23B 49/00
[52] U.S. Cl. ........................ 408/115 R; 408/97; 408/103
[58] Field of Search ........................ 408/115 R, 97, 408/103

[56] References Cited

U.S. PATENT DOCUMENTS

| | | | |
|---|---|---|---|
| 4,294,567 | 10/1981 | Wiggins | 408/115 R X |
| 4,752,162 | 6/1988 | Groh | 408/115 R |
| 4,842,453 | 6/1989 | Raines et al. | 408/97 X |
| 4,955,766 | 9/1990 | Sommerfeld | 408/97 X |
| 5,018,912 | 5/1991 | Reitz | 408/97 X |
| 5,322,396 | 6/1994 | Blacker | 408/97 X |
| 5,590,986 | 1/1997 | Juang | 408/97 X |

Primary Examiner—A. L. Pitts
Assistant Examiner—Henry W. H. Tsai

[57] ABSTRACT

A holding fixture for use in drilling pocket joints in a workpiece with a drill bit which includes a work table having a transverse rail and a transverse slot near the front side, a toggle clamp fixed to the work table to hold down the workpiece, a fixed guide member fixedly secured to the work table between the transverse rail and the transverse slot near one end, and a movable guide member supported on the work table and moved along the transverse rail and the horizontal sliding rod and horizontal locating sliding bar of the fixed guide member, each of the guide members having a top head, a bottom base supported on the work table, an oblique through hole through the top head, a back open space at the back side between the top head and the bottom base in communication with the oblique through hole for receiving wood chips from the workpiece during drilling, a guide sleeve fixedly mounted in the oblique through hole for guiding the drill bit, and a smoothly curved notch on the bottom base for supporting and guiding the tip of the drill bit.

1 Claim, 4 Drawing Sheets

HOLDING FIXTURE USED IN WOODWORKING FOR PREPARING POCKET JOINTS

BACKGROUND OF THE INVENTION

The present invention relates to woodworking apparatus, and relates more particularly to a holding fixture used in woodworking for preparing pocket joints.

U.S. Pat. No. 4,955,766 discloses a holding fixture for drilling pocket joints, in which a drilling bit 1 is used having a pocket forming portion and a smaller diameter pilot hole forming portion for drilling pocket joints (pilot hole 3 and pocket 4) on workpieces 2 and 2A for mounting screws 5, and an over-center toggle clamp is used for holding the workpiece. According to U.S. Pat. No. 4,955,766, a guide line must be marked on the workpiece before drilling pocket joints, and when a pilot hole is formed, the workpiece must be fixed in position by the over-center toggle clamp so that the desired pocket can be processed. However, the disclosure of U.S. Pat. No. 4,955,766 does not provide any means for drawing off wood chips during drilling. Deposited wood chips will affect the quality of the pocket joints, and may cause the drill bit to be damaged. Furthermore, the disclosure of U.S. Pat. No. 4,955,766 can only drill a pocket of fixed specification.

SUMMARY OF THE INVENTION

The present invention has been accomplished to provide a holding fixture for preparing pocket joints which eliminates the aforesaid drawbacks. It is one object of the present invention to provide a holding fixture for preparing pocket joints which permits the user to directly drill the workpiece without marking a standard line on it when it is set in position. It is another object of the present invention to provide a holding fixture for preparing pocket joints which prevents the drill bit from being damaged by wood chips. According to the preferred embodiment of the present invention, the holding fixture comprises a work table having a transverse rail and a transverse slot near the front side, an over-center toggle clamp fixed to the work table to hold down the workpiece, a fixed guide member fixedly secured to the work table between the transverse rail and the transverse slot near one end, and a movable guide member supported on the work table and moved along the transverse rail and the horizontal sliding rod and horizontal locating sliding bar of the fixed guide member, each of the guide members having a top head, a bottom base supported on the work table, an oblique through hole through the top head, a back open space at the back side between the top head and the bottom base in communication with the oblique through hole for receiving wood chips from the workpiece during drilling, a guide sleeve fixedly mounted in the oblique through hole for guiding the drill bit, and a smoothly curved notch on the bottom base for supporting and guiding the tip of the drill bit.

DETAILED DESCRIPTION OF THE PREFERRED EMBODIMENT

Figure 1:
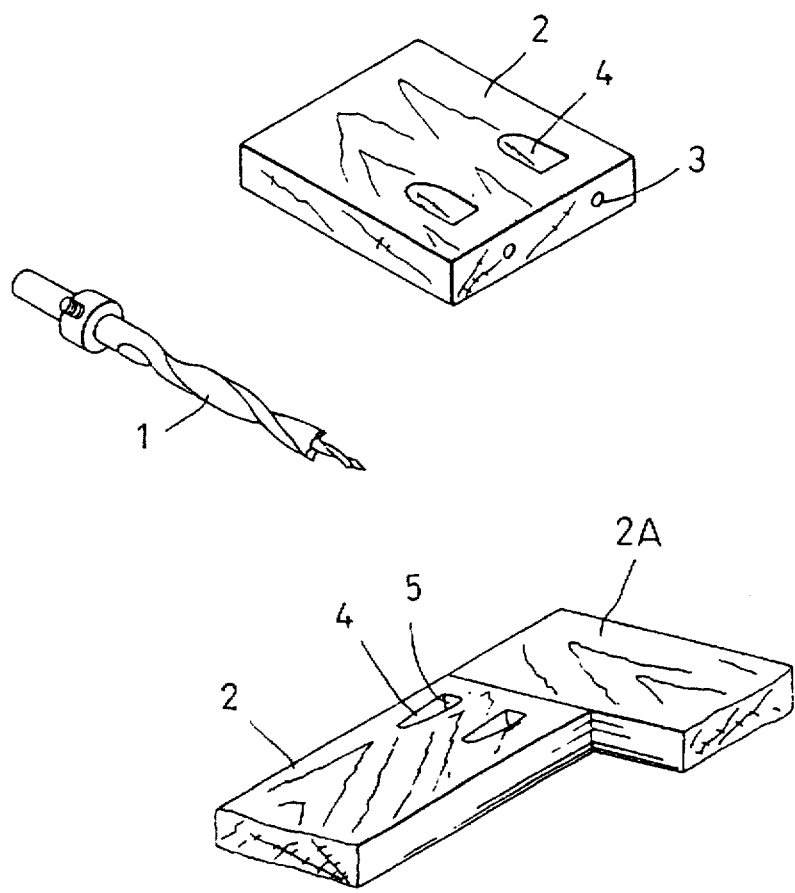
FIG. 1 shows pocket joints made on workpieces by drill bit according to the prior art.
Figure 2:
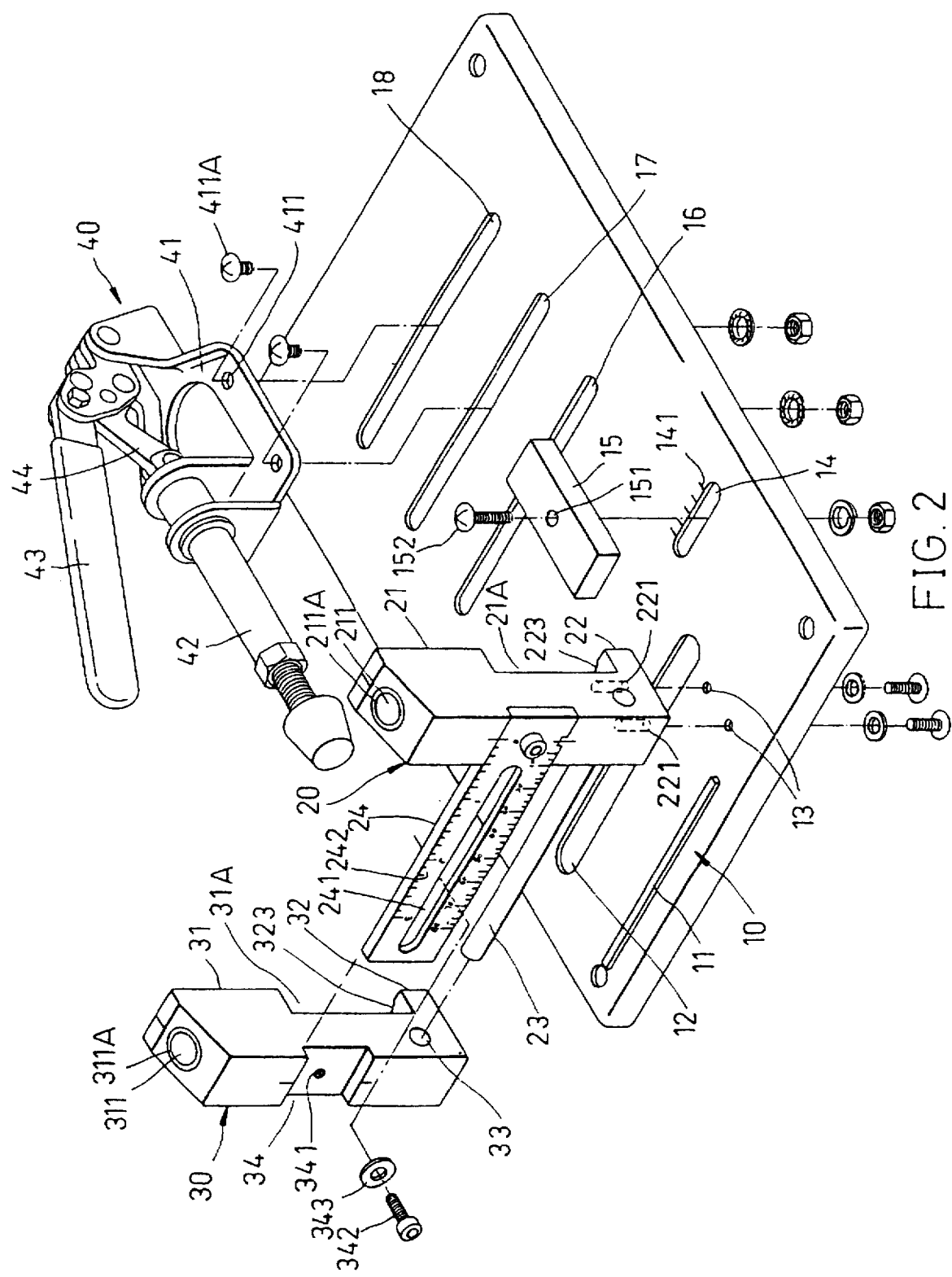
FIG. 2 is an exploded view of a holding fixture for preparing pocket joints according to the present invention.
Figure 3:
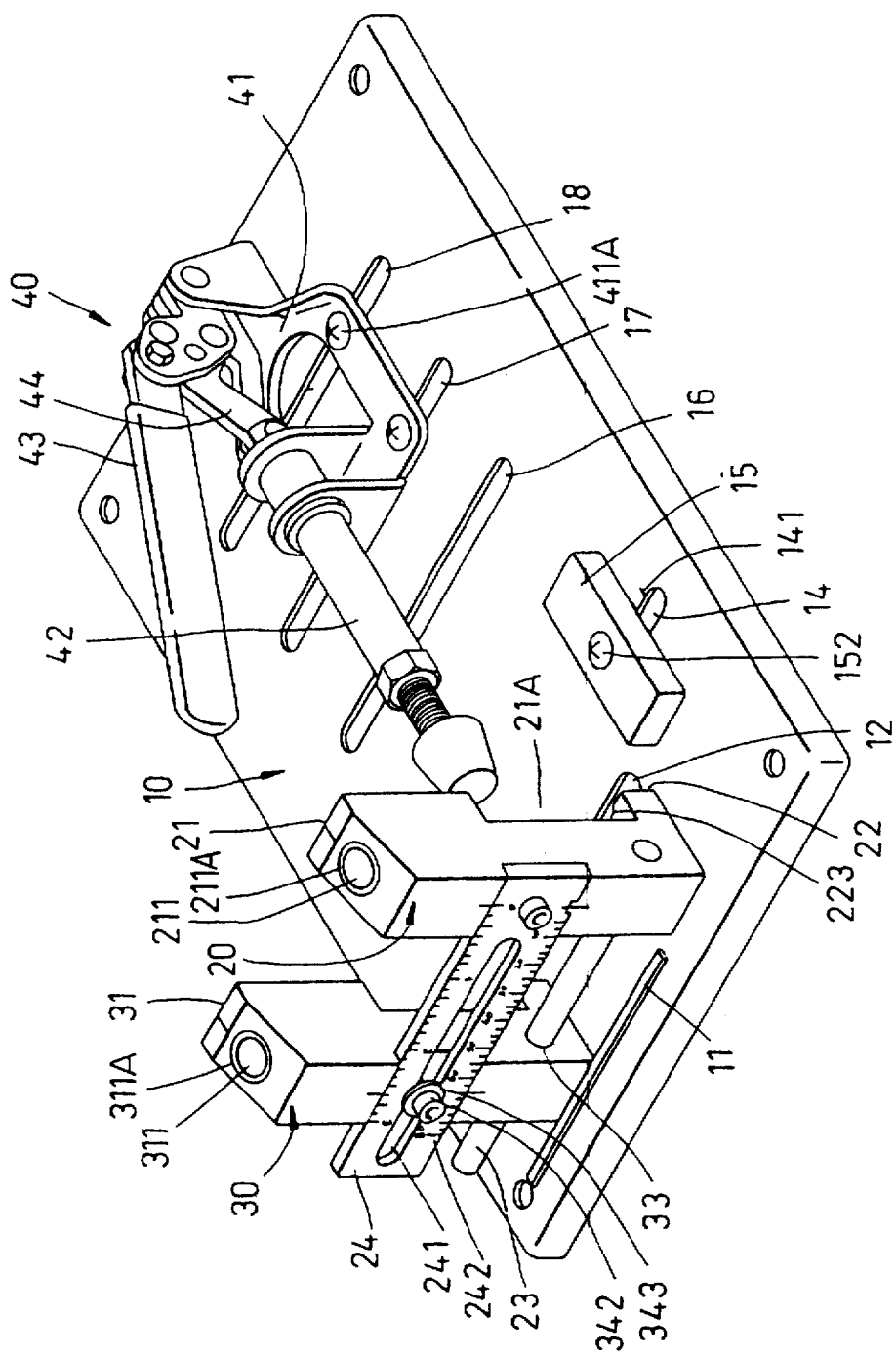
FIG. 3 is an elevational view of the holding fixture shown in FIG. 2.

Referring to FIGS. 2 and 3, a holding fixture comprises a work table 10, a fixed guide member 20, a movable guide member 30, and an over-center toggle clamp 40. The work table 10 is a rectangular flat board comprising a transverse rail 11 near one short side, a transverse slot 12 spaced from the transverse rail 11 in a parallel relation, two locating holes 13 longitudinally spaced in front of one end of the transverse slot 12, an elongated sliding slot 14 transversely disposed behind the first transverse slot 12 near one long side and bilaterally marked with graduations 141, and three transverse locating slots 16, 17, and 18 transversely disposed in parallel and spaced from the opposite short side in the longitudinal direction for mounting the over-center toggle clamp 40. A reference stop block 15 is adjustably fastened to the sliding slot 14. The reference stop block 15 is a rectangular block having a center hole 151 fastened to the sliding slot 14 at the desired location by a screw bolt 152.

The fixed guide member 20 comprises a head 21 at the top, a base 22 at the bottom, a back open space 21A at the back side (the side facing the transverse locating slots 16, 17, and 18 of the work table 10) between the head 21 and the base 22, an oblique through hole 211 through the head 21, a guide sleeve 211A fixedly mounted in the oblique through hole 211, a smoothly curved notch 223 on the base 21 in alignment with the oblique through hole 211 for supporting and guiding the tip of the drilling bit, two bottom screw holes 221 disposed at the bottom of the base 22 and respectively connected to the locating holes 13 of the work table 10 by a respective screw 222, a horizontal sliding rod 23 and a horizontal locating sliding bar 24 vertically spaced at one lateral side. The horizontal locating sliding bar 24 comprises a longitudinal sliding slot 241 bilaterally marked with graduations 242.

The movable guide member 30 is symmetrical to the fixed guide member 20, comprising a head 31 at the top, a base 32 at the bottom supported on the work table 10 and stopped at the transverse rail 11, a back open space 31A at the back side between the head 31 and the base 32, an oblique through hole 311 through the head 31, a guide sleeve 311A fixedly mounted in the oblique through hole 311, a smoothly curved notch 323 on the base 31 in alignment with the oblique through hole 311 for supporting and guiding the tip of the drilling bit, a horizontal axle hole 33, which receives the horizontal sliding rod 23 of the fixed guide member 20, a front recess 34, which receives the horizontal locating sliding bar 24, and a screw hole 341 at the center of the front recess 34. When the horizontal locating sliding bar 24 and the horizontal sliding rod 23 are respectively inserted through the front recess 34 and the axle hole 33, a screw bolt 342 is inserted through a washer 343 and the sliding slot 241 of the horizontal locating sliding bar 24, and then threaded into the screw hole 341 to fix the movable guide member 30 to the fixed guide member 20 in a parallel relation. By loosening the screw bolt 342, the movable guide member 30 can be moved in the transverse direction along the transverse rail 11 to adjust the pitch between the fixed guide member 20 and the movable guide member 30. When adjusted, the screw 342 is fastened tight to fix the movable guide member 30 in the adjusted position.

The over-center toggle clamp 40 comprises a mounting bracket 41 having four countersunk holes 411 in four corners respectively fastened to two of the three transverse locating slots 16, 17, and 18 by a respective screw bolt 411A, a piston 42 horizontally disposed at the front side, a pivotably attached operator handle 43, and an over-center link 44 connected between the operator handle 43 and the piston 42.

Figure 4:
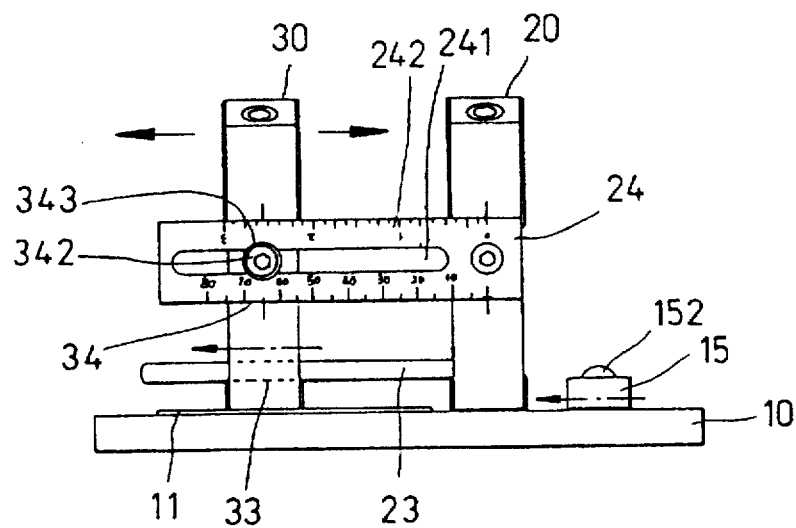
FIG. 4 is an end view showing the holding fixture of FIG. 3 adjusted.
Figure 5:
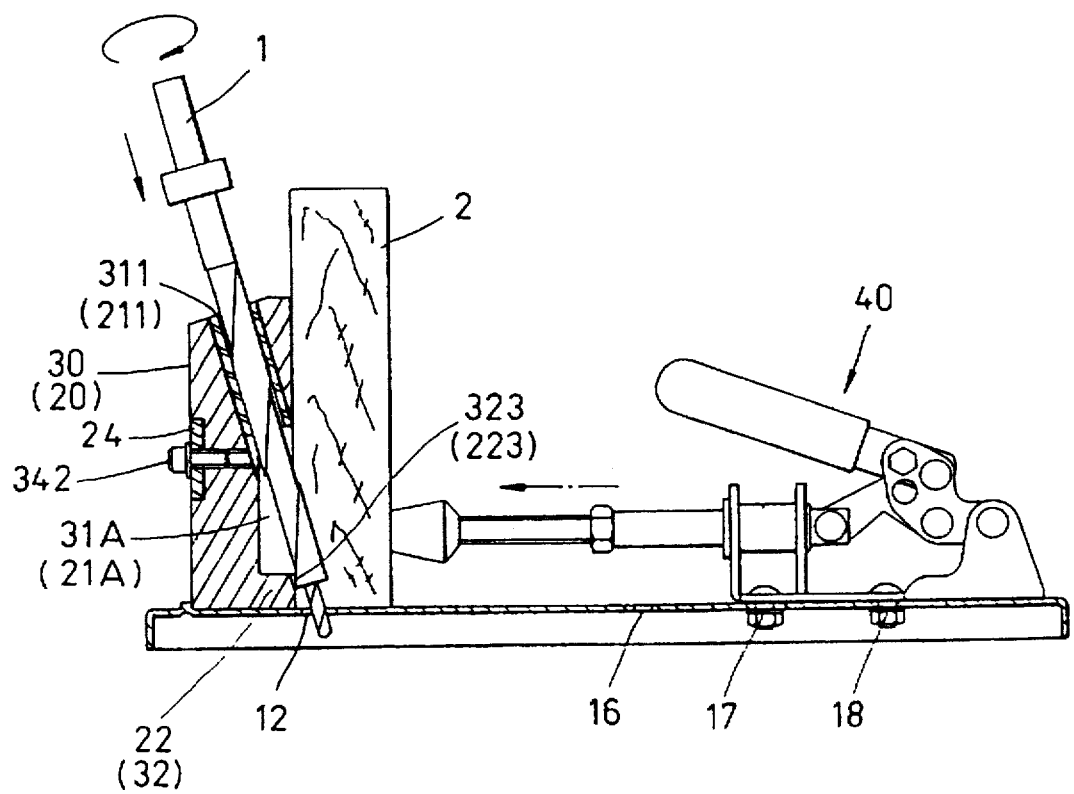
FIG. 5 is a side view showing the holding fixture of FIG. 3 operated.

Referring to FIGS. 4 and 5, and FIG. 3 again, before the operation, the holding fixture must be adjusted to the desired position. Firstly, the screw bolt 152 is loosened, permitting the reference stop block 15 to be adjusted to the desired reference location in the sliding slot 14 by means of the guidance of the graduations 141, and then the screw bolt 152 is fastened tight to fix the reference stop block 15 in position (see FIG. 3). Then, the screw bolt 342 is loosened, permitting the movably guide member 31 to be moved along the horizontal sliding rod 23 and the horizontal locating sliding bar 24 relative to the fixed guide member 20 to the desired location by means of the guidance of the graduations 242, and then the screw bolt 342 is fastened tight to fix the movable guide member 31 in the desired position (see FIG. 4). When adjusted, the workpiece 2 is closely attached to the fixed guide member 20 and the movable guide member 30 and supported on the work table 10 in vertical and stopped against the reference stop block 15, then the operator handle 43 turned forwards to force the piston 42 against the workpiece 2, and therefore the workpiece 2 is firmly retained in position for drilling, and then the drill bit 1 of a portable hand drill is inserted into the guide sleeve 211A (311A) to drill pocket joints (see FIG. 5). When the drill bit 1 penetrates through the workpiece 2, the transverse slot 12 provides a space for passing the tip of the drill bit 1, and therefore the drill bit 1 will not be damaged by the work table 10. When wood chips are produced during drilling, the open space 21A or 31A imparts a way for escaping of wood chips. By adjusting the position of the movable guide member 30 relative to the fixed guide member 20, different pocket joints can be processed.

While only one embodiment of the present invention has been shown and described, it will be understood that various modifications and changes could be made without departing from the spirit and scope of the invention disclosed.

We claim:

1. A holding fixture for use in drilling pocket joints in a workpiece with a drill bit, comprising:

a flat work table having a transverse rail near a front side thereof, and a transverse slot spaced from said transverse rail in a parallel relation for passing the drill bit;

a fixed guide member fixedly secured to said flat work table between said transverse rail and said transverse slot near one end, said fixed guide member comprising a top head, a bottom base fixed to said work table, an oblique through hole through the top head of said fixed guide member, a back open space defined at a back side thereof between the top head and bottom base of said fixed guide member in communication with the oblique through hole of said fixed guide member, a guide sleeve fixedly mounted in the oblique through hole of said fixed guide member, a horizontal sliding rod and a horizontal locating sliding bar vertically spaced at one lateral side; and a movable guide member supported on said work table and closely attached to said transverse rail and moved along said horizontal sliding rod and said horizontal locating sliding bar and said transverse rail, said movable guide member comprising a top head, a bottom base supported on said work table and stopped at said transverse rail, an oblique through hole through the top head of said movable guide member, a back open space defined at a back side thereof between the top head and bottom base of said movable guide member in communication with the oblique through hole of said movable guide member, and a guide sleeve fixedly mounted in the oblique through hole of said movable guide member;

wherein said movable guide member comprises a horizontal axle hole for receiving therein the horizontal sliding rod, and a horizontal front recess for receiving therein the horizontal sliding bar;

wherein said fixed guide member and said movable guide member have a respective smoothly curved notch on the respective bottom base in alignment with the respective oblique through hole for supporting and guiding the drill bit;

wherein said horizontal locating sliding bar comprises a longitudinal slot bilaterally marked with graduations and fixedly secured to a screw hole of a movable guide block by a screw bolt;

wherein said work table comprises an elongated sliding slot disposed near one end thereof and bilaterally marked with graduations, and a reference stop block moved in said elongated sliding slot at fixed in the desired location with said elongated sliding slot by fastening means to stop the workpiece at one side;

wherein said work table comprises three transverse locating slots arranged in a parallel relation near a rear side thereof for mounting a toggle clamp for holding down the workpiece.

\* \* \* \* \*